(12) United States Patent
Lahat

(10) Patent No.: US 6,201,792 B1
(45) Date of Patent: Mar. 13, 2001

(54) BACKPRESSURE RESPONSIVE MULTICAST QUEUE

(75) Inventor: Amir Lahat, Kibbutz Givat Brenner (IL)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/079,003

(22) Filed: May 14, 1998

(51) Int. Cl.$^7$ .............................. G06F 11/00; H04L 12/56

(52) U.S. Cl. ........................... 370/236; 370/390; 370/417

(58) Field of Search .................................. 370/231, 235, 370/236, 237, 390, 412, 417, 418, 432

(56) References Cited

U.S. PATENT DOCUMENTS

| | | | |
|---|---|---|---|
| 4,823,338 | 4/1989 | Chan et al. | 370/85 |
| 4,975,906 | 12/1990 | Takiyasu et al. | 370/85.13 |
| 5,214,646 | 5/1993 | Yacoby | 370/85.14 |
| 5,280,476 | 1/1994 | Kojima et al. | 370/60.1 |
| 5,280,481 | 1/1994 | Chang et al. | 370/85.13 |
| 5,315,582 | 5/1994 | Morizono et al. | 370/16 |
| 5,321,693 | 6/1994 | Perlman | 370/85.13 |
| 5,321,694 | 6/1994 | Chang et al. | 370/85.13 |
| 5,329,527 | 7/1994 | Ujihashi et al. | 370/85.13 |
| 5,329,619 | 7/1994 | Page et al. | 395/200 |
| 5,345,558 | 9/1994 | Opher et al. | 395/200 |
| 5,390,184 | 2/1995 | Morris | 370/94.2 |
| 5,394,402 | 2/1995 | Ross | 370/94.1 |
| 5,408,469 | 4/1995 | Opher et al. | 370/60.1 |
| 5,444,702 | 8/1995 | Burnett et al. | 370/60.1 |
| 5,519,704 | 5/1996 | Farinacci et al. | 370/85.13 |
| 5,548,646 | 8/1996 | Aziz et al. | 380/23 |
| 5,548,723 | 8/1996 | Pettus | 395/200.01 |
| 5,550,816 | 8/1996 | Hardwick et al. | 370/60 |
| 5,583,865 | 12/1996 | Esaki et al. | 370/397 |
| 5,600,644 | 2/1997 | Chang et al. | 370/404 |
| 5,633,869 | 5/1997 | Burnett et al. | 370/396 |
| 5,659,542 | 8/1997 | Bell et al. | 370/496 |
| 5,666,487 | 9/1997 | Goodman et al. | 395/200.76 |
| 5,689,500 | * 11/1997 | Chiussi et al. | 370/235 |
| 5,689,506 | * 11/1997 | Chiussi et al. | 370/388 |
| 6,049,546 | * 4/2000 | Ramakrishnan | 370/412 |

FOREIGN PATENT DOCUMENTS

| | | | |
|---|---|---|---|
| 0 785 697 A2 | 7/1997 | (EP) | H04Q/11/04 |
| WO97/04386 | 6/1997 | (WO) | G06F/9/455 |
| WO98/02821 | 1/1998 | (WO) | G06F/13/00 |

OTHER PUBLICATIONS

Tzeng, Hong–Yi et al., "On Max–Min Fair Congestion Control for Multicast ABR Service in ATM", IEEE Commmunications, vol. 15, No. 3, Apr. 1997, pp. 545–555.

Simpson, W., "IP in IP Tunneling", Request for Comments #153, Oct. 1995, 9 pages.

Swallow, G., "Frame Relay PVC Multicast Service and Protocol Description", FRF.7, Frame Relay Forum Implementation Agreement, Oct. 21, 1994, printed from internet site www.frforum.com, 17 pages.

(List continued on next page.)

Primary Examiner—Alpus H. Hsu
Assistant Examiner—Afsar M. Qureshi
(74) Attorney, Agent, or Firm—Howard Zaretsky; David J. Weitz; Wilson Sonsini Goodrich & Rosati

(57) ABSTRACT

A multicast queue for controlling cell traffic to individual output queues in a multicast group in accordance with the backpressure information generated by each output queue. One or more destinations asserting the backpressure signal are identified and, in response, the corresponding one or more destinations are removed from the 'distribution list' in the routing tag associated with the connection. In this fashion, a cell that originated at a multicast source queue can be transmitted to the remaining destination queues that are not in a congested state. Cell traffic will cease only to those destination queues that generated the backpressure signal indicating that they are full. If the congestion at an output port is removed, the corresponding backpressure bit is reset and cell traffic resumes to that particular output port.

4 Claims, 6 Drawing Sheets

OTHER PUBLICATIONS

Cisco—"Packet Services", printed from website http://www.cisco.com/warp/public/732/Tech/pksrv_tc.html, 32 pages, Dec. 1995.

Deering, S., "Host Extensions for IP Multicasting", Request for Comments (RFC) 1112, Stanford University, 16 pages, Aug. 1989.

Egevang, K. et al., "The IP Network Address Translator (NAT)", Request for Comments (RFC) 1631, Cray Communications, 12 pages, May 1994.

"All About . . . Multicast Wide Area Network Services", printed from website http://www.starburstcom.com/mcast.html, 11 pages, Feb. 1997.

Ellington, B. (Ed.), LAN Emulation SWG Drafting Group, "LAN Emulation Over ATM Specification—Version 1.0", ATM Forum, pp. 1–139, (1995).

Novell Netware Network Computing Products 3.12, "NetWare 3.12 Concepts", Novell, Inc., USA, Part No.: 100–001715–001, Jul. 1993, pp. 158–163.

Novell NetWare Network Computing Products 3.12, "TCP/IP Transport Supervisor's Guide", Novell, Inc., USA, Part No. 100–001866–001, May 1993, pp. B–15–B22.

Kwok, T., "ATM: The New Paradigm for Internet, Intranet and Residential Broadband Services and Applications", Prentice–Hall, pp. 214–215 and 256–258 (1998).

* cited by examiner

BACKPRESSURE RESPONSIVE MULTICAST QUEUE

FIELD OF THE INVENTION

The present invention relates generally to data communications equipment and more particularly relates to an apparatus for and a method of implementing a multicast queue responsive to backpressure.

BACKGROUND OF THE INVENTION

More and more reliance is being placed on data communication networks to carry increasing amounts of data. In a data communications network, data is transmitted from end to end in groups of bits which are called packets, frames, cells, messages, etc. depending on the type of data communication network. For example, Ethernet networks transport frames, X.25 and TCP/IP networks transport packets and ATM networks transport cells. Regardless of what the data unit is called, each data unit is defined as part of the complete message that the higher level software application desires to send from a source to a destination. Alternatively, the application may wish to send the data unit to multiple destinations.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

More information on ATM networks can be found in the book "ATM: The New Paradigm for Internet, Intranet and Residential Broadband Services and Applications," Timothy Kwok, Prentice Hall, 1998.

ATM uses very short, fixed length packets called cells. The first five bytes, called the header, of each cell contain the information necessary to deliver the cell to its destination. The cell header also provides the network with the ability to implement congestion control and traffic management mechanisms. Fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol in the ATM switch. ATM provides the User Network Interface (UNI) which is typically used to interconnect an ATM user with an ATM switch that is managed as part of the same network.

Unicast and Multicast Connections

The transmission of data to a single destination is termed a unicast connection while the transmission of data to multiple destinations is termed a multicast connection. For example, in connection with ATM switches, for each call connection within the switch, each cell has associated with it a routing tag that identifies the destination for the cell. For multicast connections, the routing tag includes identification of several destinations for the cell.

The majority of data communication networks today attempt to not lose even a single bit of information. In order to achieve such high levels of performance and low error rates, the network equipment is constructed with relatively large sized queues. The large queues are needed in order to handle the accumulation of cells (or packets, frames, etc.) without overflowing the queues. An overflow of a queue will result in cells being lost, i.e., dropped. Cells may be dropped at the source queue if the destination is full and thus cannot receive additional cells. In this case, the source queue fills up and at some point will overflow, with the consequent cell loss.

The destination queue uses a backpressure signal to indicate to the source queue that the destination queue is full and cannot receive additional cells. This problem is exasperated in multicast connections since each cell in the source multicast is replicated to several destination queues. In prior art data communications devices, the backpressure signal from any output port on the distribution list of the multicast connection will cause cell traffic to cease to the output port that is full and all the other output ports in the multicast group regardless of whether they are congested or not.

SUMMARY OF THE INVENTION

The present invention is a multicast queue for controlling cell traffic to individual output queues in a multicast group in accordance with the backpressure information generated by each output queue. One or more destinations that are sending the backpressure signal are identified and, in response thereto, the corresponding one or more destinations are removed from the The multicast source queue associated with a multicast connection holds cells that are designated to be sent to several destinations. When a cell is transmitted, it is duplicated at the far end, i.e., at the designated destination queues. A backpressure signal is generated from a port whose associated output queue is full and cannot further receive cell traffic. If the output queue that is full is one of the destinations of the multicast cell that is at the head of the multicast queue, then, in prior art devices, the cell will not be transmitted to all the destinations in the multicast group. Only when no backpressure data is received for all destination output queues, are cells permitted to be transmitted. This may cause relatively long delays on all non backpressured (non congested) destination output queues and requires the use of extremely large buffers for the multicast queue to overcome the problem.

For each unicast call connection within the switch, each cell has associated with it a routing tag that identifies the destination for the cell. For multicast connections, the routing tag includes identification of several destinations for the cell. The present invention functions to identify the one or more destinations that are sending the backpressure signal. In response to the backpressure signal, the corresponding one or more destinations are removed from the 'distribution list' in the connection tag field. In this fashion, a cell that originated at a multicast source queue can be transmitted to the remaining destination queues that are not in a congested state. Cell traffic will cease only to those destination queues that generated the backpressure signal indicating that they are full.

In this fashion, the multicast queue is not loaded and all the non backpressured (non congested) destination output queues receive the multicast cell traffic with minimal delay.

Suitable applications for the present invention include video transmission over the UDP transport layer, voice over ATM and any other time sensitive application including those that utilize UDP over IP.

There is provided in accordance with the present invention a multicast queue in a data communication device, the data communication device consisting of a plurality of output queues, each output queue associated with an output port, wherein each output port generates a backpressure signal when its associated output queue becomes full, the multicast queue comprising a multicast tag register having a plurality of bits, wherein each bit is associated with one of the output ports, each bit in the multicast register indicating membership in a multicast group, each output port in the multicast group receiving a copy of each cell output from the multicast queue, a backpressure information register having a plurality of bits, wherein each bit is associated with one of the output ports, each bit in the backpressure register indicating whether the corresponding output port is full and a modified multicast tag register having a plurality of bits, wherein each bit is associated with one of the output ports, each bit in the modified multicast tag register indicating whether the corresponding output port is to receive a copy of cells output from the multicast queue.

The bits of the modified multicast tag register are generated by XORing the corresponding bits of the multicast tag register and the backpressure information register.

There is also provided in accordance with the present invention a multicast queue in a data communication device, the data communication device consisting of a plurality of output queues, each output queue associated with an output port, wherein each output port generates a backpressure signal when its associated output queue becomes full, the multicast queue comprising means for establishing and maintaining a multicast tag register having a plurality of bits, wherein each bit is associated with one of the output ports, each bit in the multicast register indicating membership in a multicast group, each output port in the multicast group receiving a copy of each cell output from the multicast queue, means for receiving the backpressure signal in response to one or more output queues being full, means for disabling multicast cell traffic to output ports corresponding to the one or more full output queues in response to the backpressure signal and means for sending multicast traffic to all output queues associated with output ports that have not generated the backpressure signal.

The multicast queue further comprises means for resuming the transmission of multicast traffic to an output port previously disabled in response to the removal of the backpressure signal.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ANSI | American National Standards Institute |
| ATM | Asynchronous Transfer Mode |
| CAC | Connection Admission Control |
| CCITT | Comite Consulatif International Telegraphique et Telephonique |
| CPU | Central Processing Unit |
| SONET | Synchronous Optical Network |
| FDDI | Fiber Distributed Data Interface |
| IP | Internet Protocol |
| ITU | International Telecommunications Union |
| MC | Multicast |
| UDP | User Datagram Protocol |
| UNI | User to Network Interface |
| VCI | Virtual Circuit Indicator |
| VPI | Virtual Path Indicator |

General Description

Figure 1:
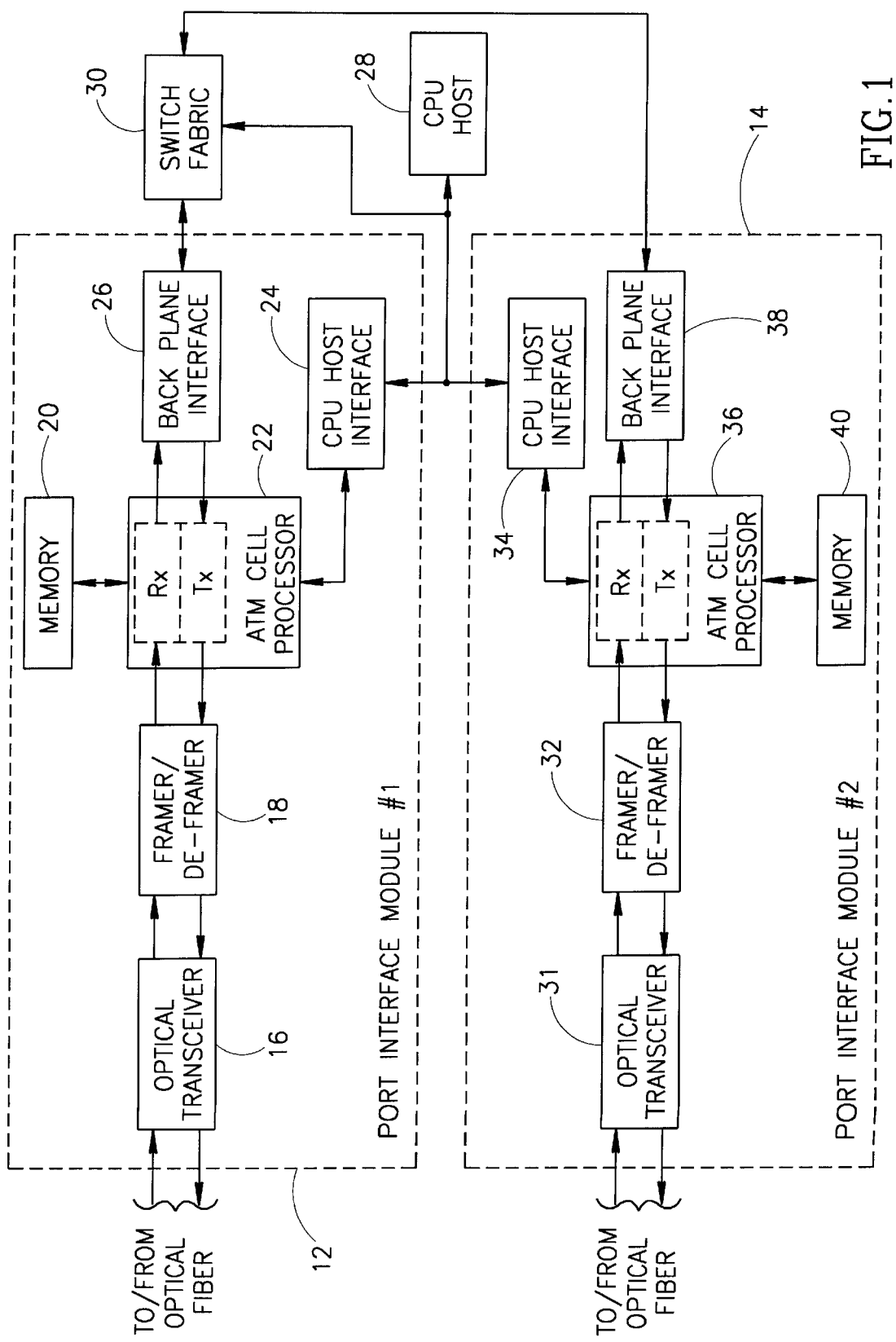
FIG. 1 is a diagram illustrating a portion of an ATM switch consisting of two port interface modules and the switching fabric.

A diagram illustrating a portion of an ATM switch consisting of two port interface modules and the switching fabric is shown in FIG. 1. A switch can include any number of port interface modules, however, only two are shown to aid in illustrating the principles of the present invention. In addition, although the description of the present invention is presented in the context of an ATM switch, it is understood that the principles of the present invention can be applied to many other types of network communications equipment as well.

The elements of the switch include port interface modules #1 12 and #2 14, a switching fabric 30 and a CPU host 28. Port interface module 12 comprises an optical transceiver 16, framer/de-framer 18, ATM cell processor 22, memory 20, backplane interface 26 and CPU interface 24. Similarly, port interface module 14 comprises an optical transceiver 31, framer/de-framer 32, ATM cell processor 36, memory 40, backplane interface 38 and CPU interface 34.

Optical signals received from the optical fiber enter the optical transceiver where they are converted to electrical signals. The format of the signals on the fiber may be, for example, in accordance with the SONET standard. The de-framer removes the SONET or other signal format from the fiber and generates the electrical signal data which is then output by the transceiver. The electrical data output may be in the form of ATM cells or otherwise, which are then input to the ATM cell processor. The cell processor schedules the transmission of cells to the switching fabric at the appropriate times. The cell processor interfaces to the switching fabric via the backplane interface. The switch fabric functions to switch cells present at its input to one of its outputs.

Assume, for example, that a connection was set up whereby port interface module #1 sends cell data to port interface module #2. The cells input via port interface module #1 would be switched to port interface module #2 via the switch fabric. The Tx portion of the cell processor 36 receives the cells via backplane interface 38 and stores them in a queue in memory 40. Subsequently, the cells are framed from their ATM cell format via framer/de-framer 32 and input to the optical transceiver 31 which functions to convert electrical input signals to optical output signals suitable for transmission on the optical fiber, e.g., in optical format suitable for SONET or any other standard. The optical output signals are then transmitted over the attached optical fiber.

The Rx portion of the cell processor performs various functions, one of which includes queuing the cell data. Other functions performed by the cell processor include memory management, cell scheduling and VPI/VCI handling. The cell processor maintains separate queues for each VPI/VCI pair. Note that separate queues are maintained in accordance with the type of call: either unicast or multicast. Unicast calls are point to point calls whereas multicast calls are point to multipoint calls. The two types of calls are handled differently inside the switch in that unicast calls require cells to be transported from an input queue to one output queue. Multicast calls require cells to be transported from an input queue to more than one output queue.

A unicast queue is a physical queue that accumulates cells designated to be transmitted to a single destination queue and is associated with a point to point connection. A multicast queue is a physical queue that accumulates cells designated to be transmitted to several destination queues and is associated with a point to multipoint connection. Although each cell in a multicast queue is designated to be transmitted to several destination queues, there exists only one copy of the cell in the source queue regardless of the number of destination queues.

Figure 2:
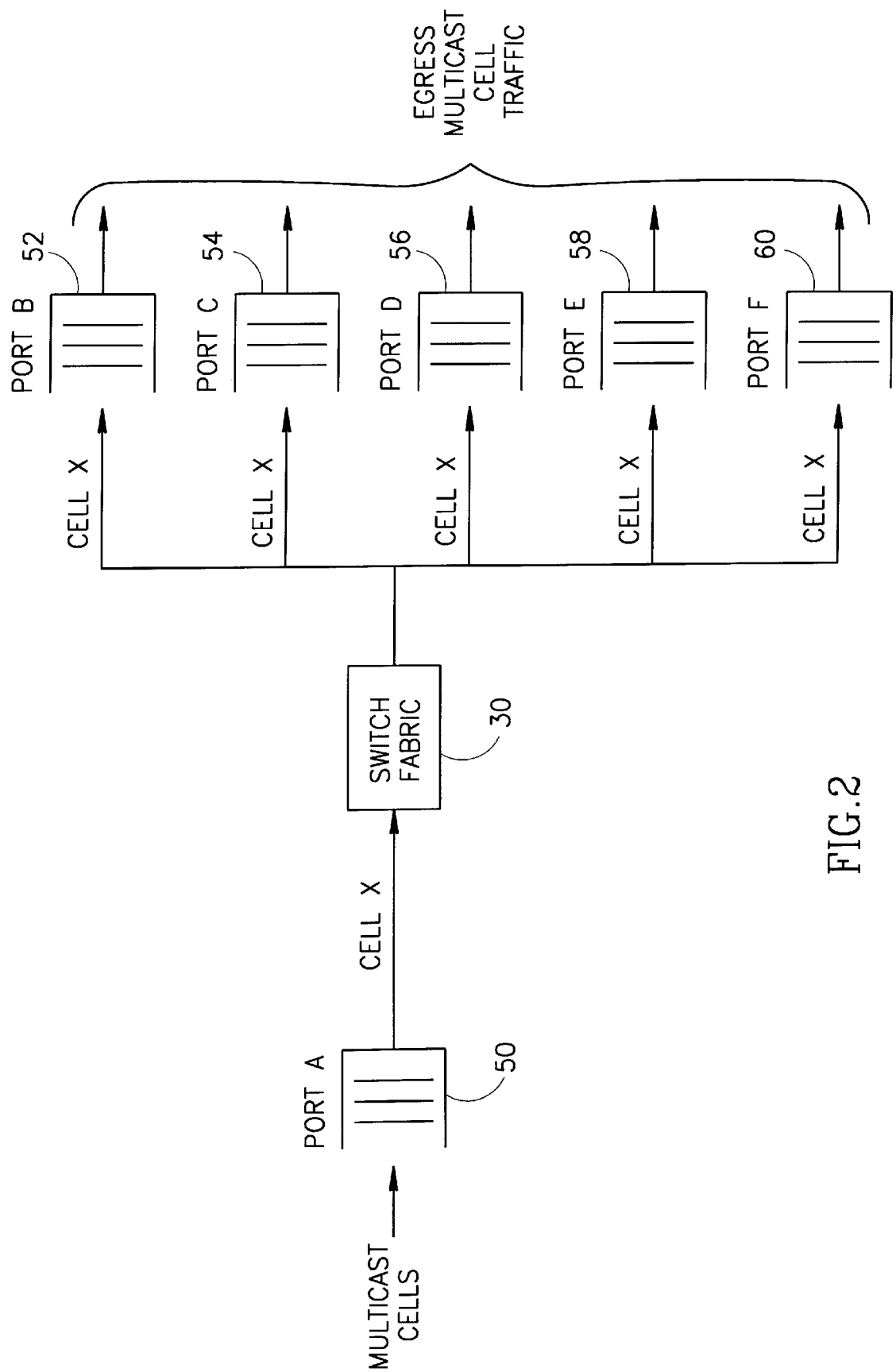
FIG. 2 is a diagram illustrating cell transmission from a multicast queue to a plurality of output queues when none of the output queues are congested.

A diagram illustrating cell transmission from a multicast queue to a plurality of output queues when none of the output queues are congested is shown in FIG. 2. To illustrate the principles of the present invention, a multicast connection is shown having five designated destinations. The cells received on port A are placed in a multicast queue 50, e.g., cell X. The cell processor in the port interface module associated with port A schedules the transmission of cells, e.g., cell X, in the multicast queue 50 into the switching fabric 30. A cell entering the switch is switched to its respective destinations. In this example the designated destinations include port B, port C, port D, port E and port F. As described previously, although only one copy of cell X exists in the multicast source queue, cell X is replicated to the queues associated with each of the destination ports, i.e., queue 52 in port B, queue 54 in port C, queue 56 in port D, queue 58 in port E and queue 60 in port F. Cell X is output from ports B though F and thus constitutes the egress multicast cell traffic.

It is important to note that FIG. 2 illustrates the case when there is no congestion at any of the destination queues 52, 54, 56, 58 or 60 in ports B through F, respectively. All cells sent to each port are output to their egress destinations. Congestion may occur on a port when its output queue becomes full.

Cell queues are typically constructed to be relatively large in order to be able to accumulate cells so as to prevent cells from being dropped in the event the destination queue is full. The dropping of cells occurs when the destination queue notifies the source queue that the destination queue is full. The notification is performed by sending a signal known as a backpressure signal from the destination queue to the source queue via the switching fabric. The backpressure signal is updated on a cell by cell basis.

In response to the backpressure signal, the source queue accumulates cells while waiting for the destination queue to send it a signal permitting it to resume cell transmissions. If the destination queue does not receive a signal to resume cell transmission, the source queue will become full at some point in time, i.e., overflow, and cells will begin to be dropped.

This problem exists with both unicast and multicast queues. The problem, however, is compounded when the queue is a multicast queue. In this case, any of the designated destination queues may become full and generate a backpressure signal to indicate to the source queue that it is congested and cannot receive any more cells . The source multicast queue receives the backpressure signal and, in response, stops transmitting cells. Once the source queue stops transmitting cells, all the designated destination queues stop receiving cells, not just the destination queue that became full.

If the backpressure signal remains, the source queue will ultimately fill and cells are then dropped. It is important to note that even if only one of several destination queues is full and generates the backpressure signal, cells cease to be transmitted to the other designated destination queues regardless of the fact that they are not congested. An example of this problem will now be presented.

Figure 3:
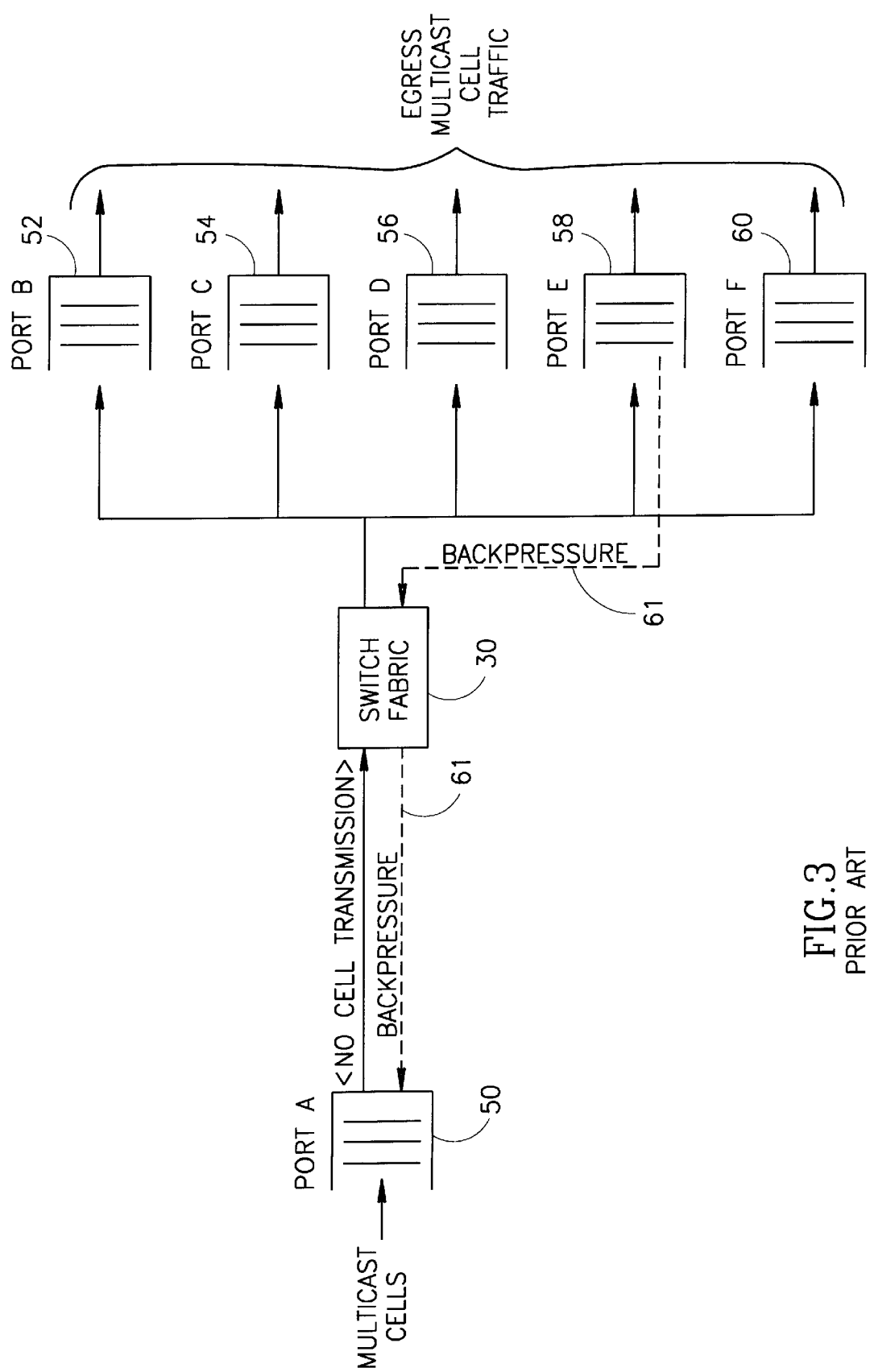
FIG. 3 is a diagram illustrating prior art example of the cessation of cell traffic from a multicast queue to the output queues when one of the output queues is congested.

A diagram illustrating prior art example of the cessation of cell traffic from a multicast queue to the output queues when one of the output queues is congested is shown in FIG. 3. Multicast cells are stored awaiting transmission in multicast queue 50 associated with polt A. Ports B though F are the designated destination ports for the multicast connection illustrated. The output queue 58 on port E, however, is full and, in response, it generates backpressure signal 61 which is transmitted to the source multicast queue via the switching fabric. In response to the backpressure signal, the multicast queue in port A ceases to transmit any cells to the switching fabric. Not only does the destination queue on port E stop receiving cell traffic, but the destination queues on ports B, C, D and F also stop receiving cell traffic regardless of whether they are full or not. If the backpressure signal is applied for a long enough time, the multicast source queue 50 will fill and cells will be dropped.

The present invention solves this problem by identifying which designated destination queues are full and only ceasing cell traffic to those queues. The other designated destination queues continue to receive cell traffic. This is a more optimum response to the backpressure signal which serves to maximize the throughput of cells. The present invention is based on the premise that many of today's applications do not require 100% of data transmitted end to end. They do, however, require minimum delay in the time period of transmission. These types of applications include video conferencing, telephony, voice over data networks, etc. These types of applications can tolerate the loss of cells but are sensitive to transmission delays. Thus, in multicast connections, it is better to lose one or more cells on one destination or branch than it is to cease cell transmission on all destinations or branches.

For each call connection within the switch, each cell has associated with it a routing tag that identifies the destination for the cell. For multicast connections, the routing tag includes identification of several destinations for the cell. The present invention functions to identify the one or more destinations that are sending the backpressure signal. In response to the backpressure signal, the corresponding one or more destinations are removed from the 'distribution list' in the connection tag field. In this fashion, a cell that originated at a multicast source queue can be transmitted to the remaining destination queues that are not in a congested state. Cell traffic will cease only to those destination queues that generated the backpressure signal indicating that they are full. Typically, the applications associated with the congested queues are able to handle the cell loss.

Figure 4:
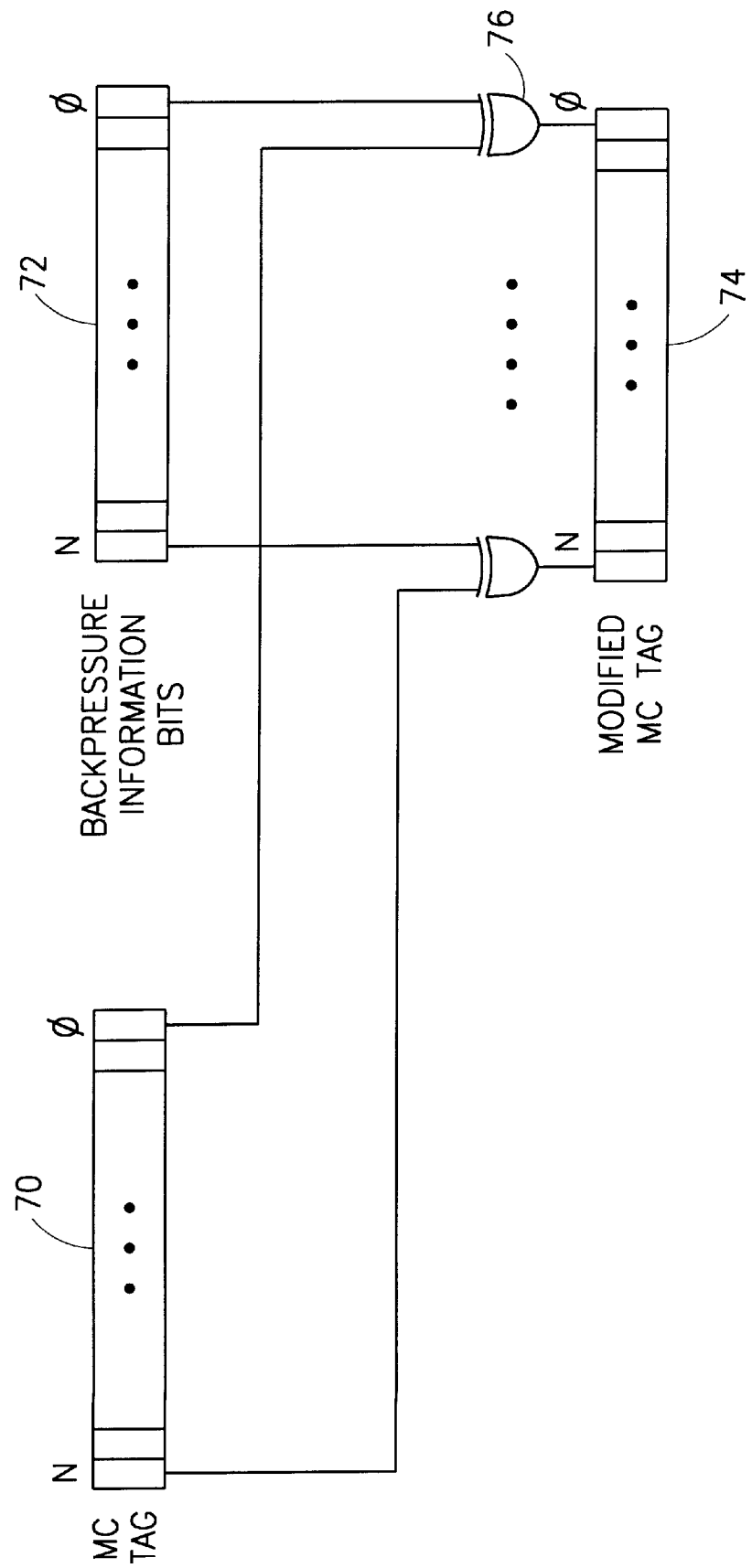
FIG. 4 is a schematic diagram illustrating the generation of the modified multicast tags using the backpressure information bits.

A schematic diagram illustrating the generation of the modified multicast tags using the backpressure information bits is shown in FIG. 4. Each multicast source queue has associated with it a multicast (MC) tag 70 which comprises one bit for each of N possible output destination queues. If a bit is set, it indicates that the cell is to be replicated to that destination queue. The multicast tag bits may be stored in a register or any other suitable memory location.

In addition, there is a set of bits 72 indicating the backpressure information received from the N possible output destination queues. If a bit is set it indicates that the corresponding output queue is congested and additional cells should not be transmitted until the backpressure signal is removed. The backpressure information bits may be stored in a register or any other suitable memory location.

The multicast tag bits and the backpressure information bits are XORed together via a plurality of XOR gates 76 to generate a modified multicast tag 74. The bits in the modified multicast tag are used to determine whether an output queue receives a copy of the cell or not. Thus, the multicast tag bits and the backpressure information bits are combined thus permitting one or more output queues to be full while permitting the remaining designated output queues to continue receiving cell traffic.

Figure 5:
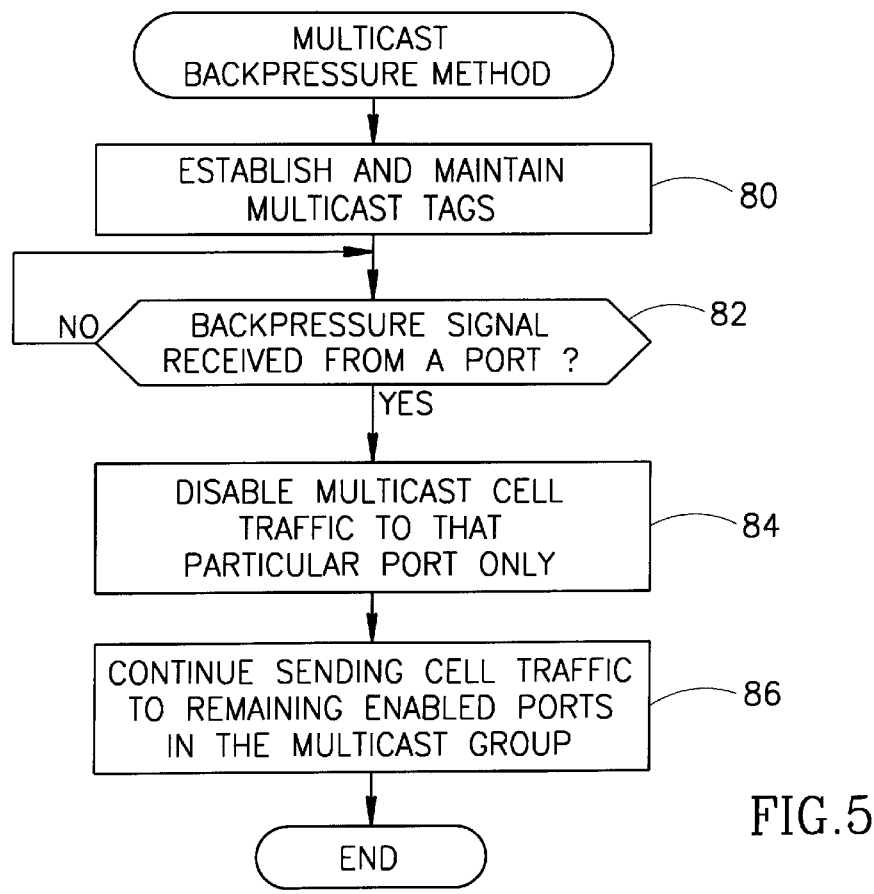
FIG. 5 is a flow diagram illustrating the multicast backpressure method of the present invention.

A flow diagram illustrating the multicast backpressure method of the present invention is shown in FIG. 5. First, the multicast tags indicating the output queues on the 'distribution list' that are to receive the multicast traffic are established and maintained (step 80). If a backpressure signal is received from a particular port (step 82) then the multicast cell traffic to that output port only is disabled (step 84). Cell traffic continues to be sent to the non congested ports on the multicast distribution list (step 86).

Figure 6:
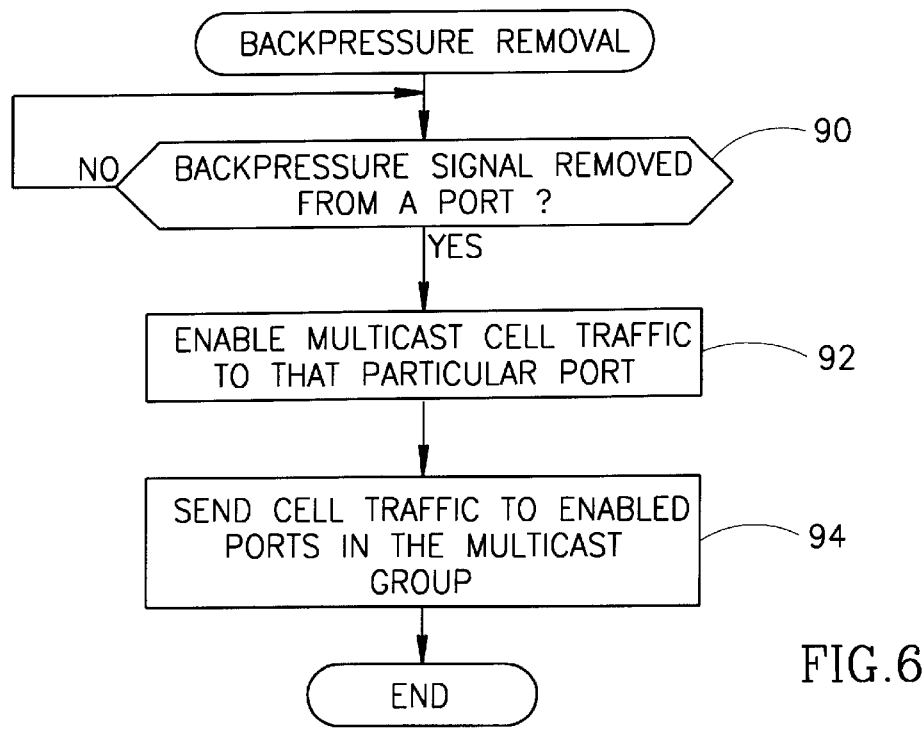
FIG. 6 is a flow diagram illustrating the backpressure removal method of the present invention.

A flow diagram illustrating the backpressure removal method of the present invention is shown in FIG. 6. When the congestion on an output port is removed, the backpressure signal is consequently also removed (step 90). When this occurs, multicast cell traffic is re-enabled to that particular port (step 92). Cell traffic then flows to all the non congested ports in the multicast group (step 94).

Figure 7:
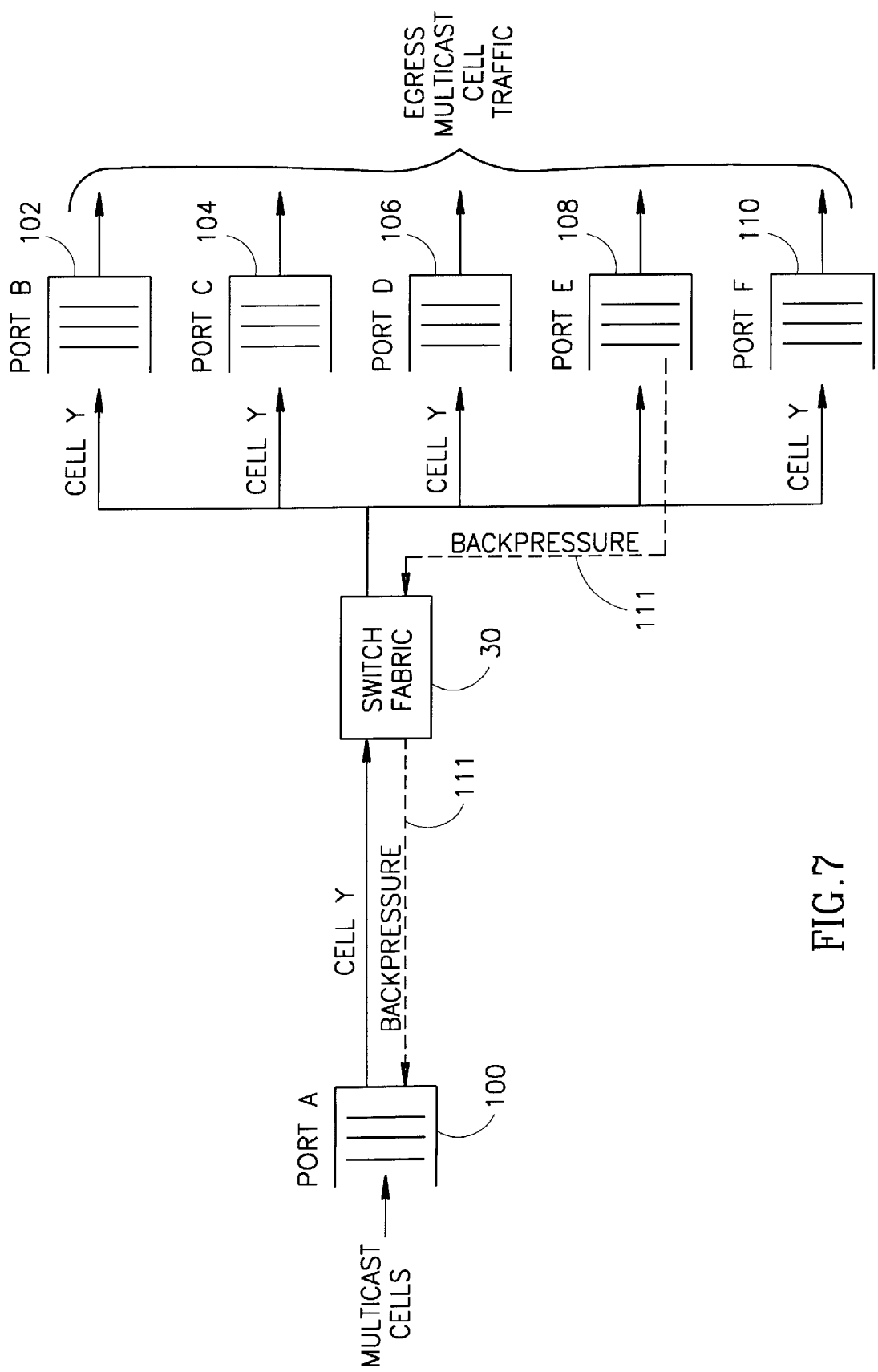
FIG. 7 is a diagram illustrating cell transmission from a multicast queue to a plurality of output queues using the method of the present invention.

A diagram illustrating cell transmission from a multicast queue to a plurality of output queues using the method of the present invention is shown in FIG. 7. Initially, the source multicast queue 100 in port A sends cell traffic, e.g., cell Y, via the switching fabric 30 to the destination queues 102, 104, 106, 108 and 110 in ports B, C, D, E, and F, respectively, thus constituting the egress multicast cell traffic for that particular multicast connection.

The output queue 108 on port E eventually becomes congested and sends a backpressure signal 111 to the source multicast queue via the switching fabric. In response, the bit corresponding to the congested output queue is set to '0' in the modified multicast tag associated with the source multicast queue thus dropping port E from the multicast destination list. The multicast cells are then sent to ports B, C, D and F only. If and when the congestion at the output queue in port E is relieved, the backpressure signal will be de-asserted and cell traffic will resume to port E.

In addition, the software in the switch and/or the attached device can have knowledge of the type of application associated with the connection. If the application is more sensitive to time delays but less sensitive to 100% data delivery, e.g., applications such as voice and video that utilize UDP over IP, then the features provided by the present invention can be enabled. Otherwise, they can be disabled for that particular connection. For example, the CAC within the switch (for ATM switches) can control whether this feature is enabled or disabled on a call by call basis. If the feature is to be disabled, the bits in the backpressure information bits field 72 (FIG. 4) can be set to '0' thus not effecting the bits in the multicast tag 70. If the feature is enabled, the bits in the backpressure information field are permitted to be set to other than '0' thus indicating that one or more ports are full.

While the invention has been described with respect to a limited number of embodiments, it will be appreciated that many variations, modifications and other applications of the invention may be made.

What is claimed is:

1. A multicast queue in a data communication device, said data communication device consisting of a plurality of output queues, each output queue associated with an output port, wherein each output port generates a backpressure signal when its associated output queue becomes full, said multicast queue comprising:

a multicast tag register having a plurality of bits, wherein each bit is associated with one of said output ports, each bit in said multicast register indicating membership in a multicast group, each output port in said multicast group receiving a copy of each cell output from said multicast queue;

a backpressure information register having a plurality of bits, wherein each bit is associated with one of said output ports, each bit in said backpressure register indicating whether or not the corresponding output port is full; and a modified multicast tag register having a plurality of bits, wherein each bit is associated with one of said output ports, each bit in said modified multicast tag register indicating whether the corresponding output port is to receive a copy of cells output from said multicast queue.

2. The multicast queue according to claim 1, wherein the bits of said modified multicast tag register are generated by XORing the corresponding bits of said multicast tag register and said backpressure information register.

3. A multicast queue in a data communication device, said data communication device consisting of a plurality of output queues, each output queue associated with an output port, wherein each output port generates a backpressure signal when its associated output queue becomes full, said multicast queue comprising:

means for establishing and maintaining a multicast tag register having a plurality of bits, wherein each bit is associated with one of said output ports, each bit in said multicast register indicating membership in a multicast group, each output port in said multicast group receiving a copy of each cell output from said multicast queue;

means for receiving said backpressure signal in response to one or more output queues becoming full;

means for disabling multicast cell traffic to output ports corresponding to said one or more full output queues in response to said backpressure being asserted; and means for sending multicast traffic only to output queues associated with output ports that have not generated said backpressure signal.

4. The multicast queue according to claim 3, further comprising means for resuming the transmission of multicast traffic to an output port previously disabled in response to the removal of said backpressure signal.

* * * * *